3 Sheets—Sheet 1.
E. REISERT.
Grain-Meter.
No. 214,953. Patented April 29, 1879.
Fig. I.
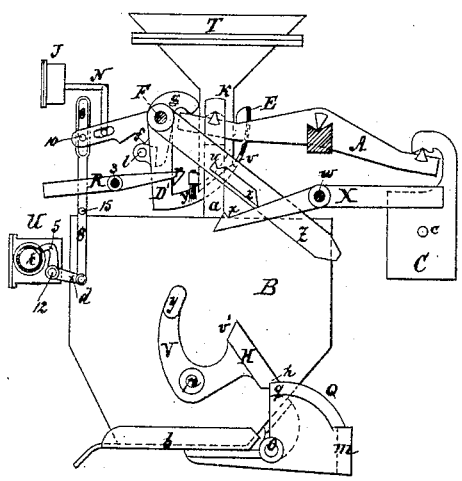
Fig. II.
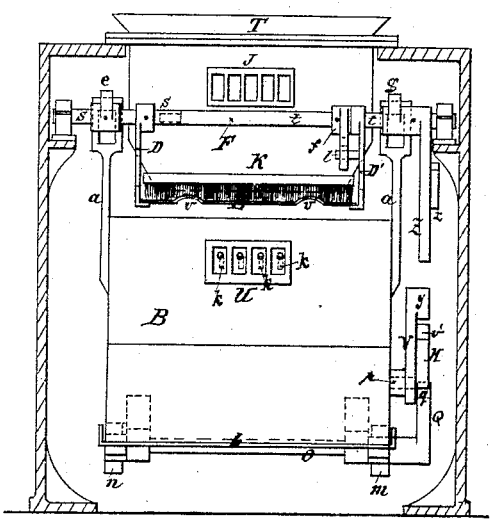
Fig. III.
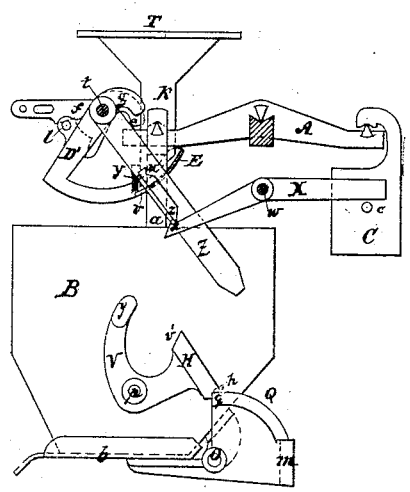
Fig. IV.
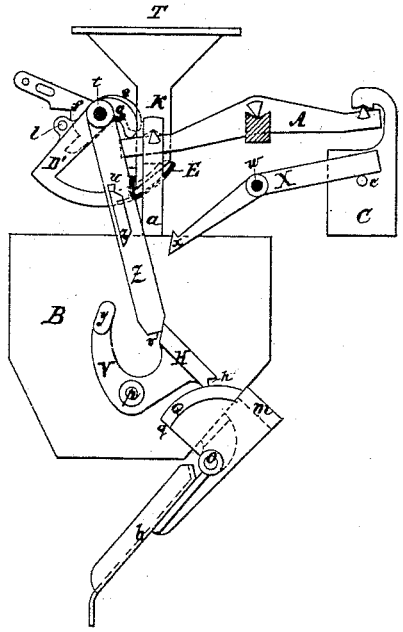
Witnesses.
O. Arnold
A. W. Van Blarcom
Inventor.
Edward Reisert
per Henry E. Roeder
Attorney.

E. REISERT.
Grain-Meter.
No. 214,953. Patented April 29, 1879.
3 Sheets—Sheet 2.
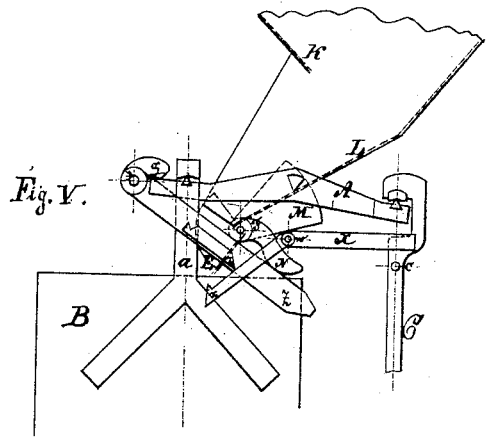
Fig. V.
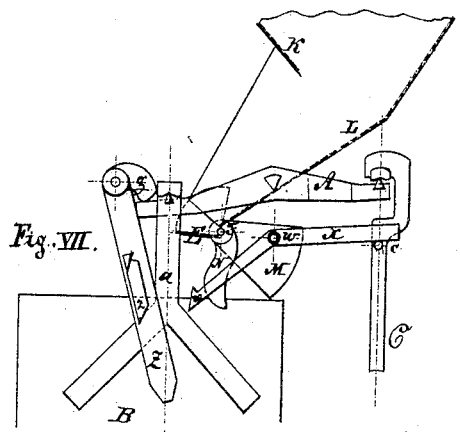
Fig. VII.
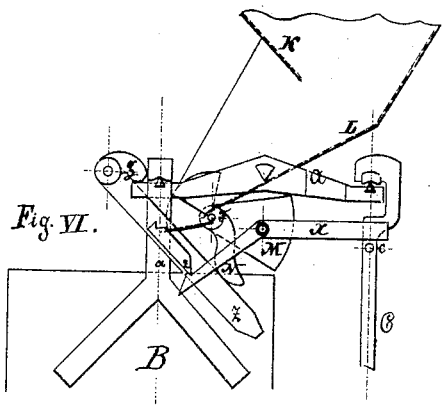
Fig. VI.
Witnesses:
Ludolf Portong
A. Van Blarcom
Inventor:
Edward Reisert
Jn. Henry & Roeder
Attorney E. REISERT.
Grain-Meter.
No. 214,953. Patented April 29, 1879.
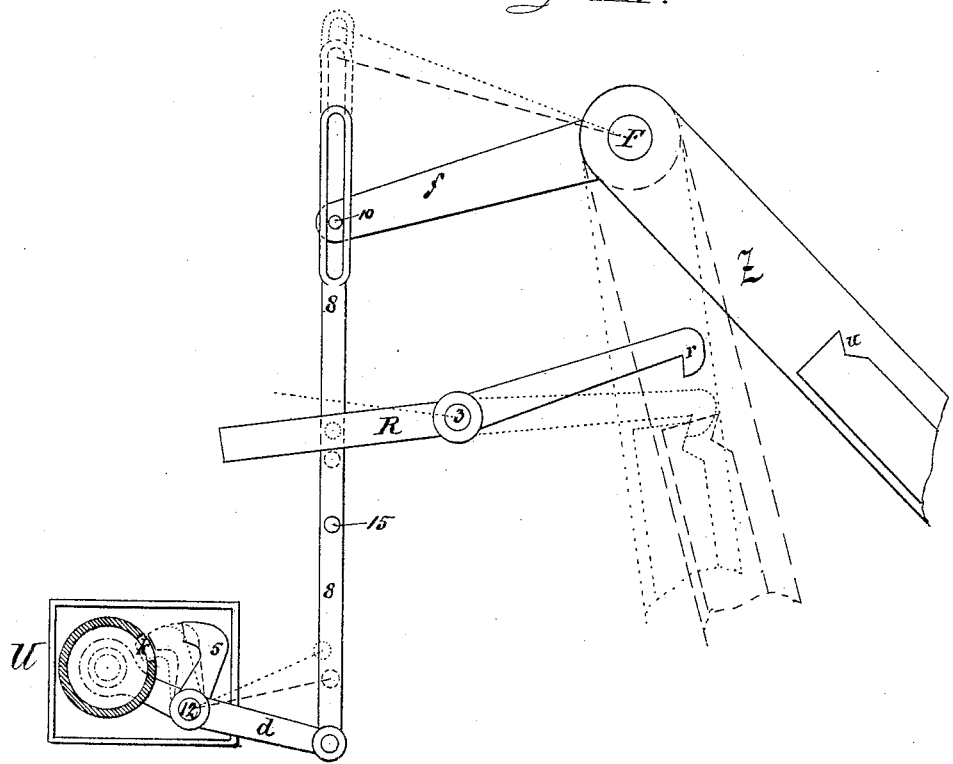
Fig. VIII.
Witnesses.
W. Heuermann
A. Van Blarcom
Inventor.
Edward Reisert
per Weery & Roeder
attorneys

UNITED STATES PATENT OFFICE.

EDWARD REISERT, OF COLOGNE, PRUSSIA, ASSIGNOR TO SCHAEFFER & BUDENBERG, OF BUCKAU, NEAR MAGDEBURG, GERMANY.

IMPROVEMENT IN GRAIN-METERS.

Specification forming part of Letters Patent No. 214,953, dated April 29, 1879; application filed May 17, 1878.

*To all whom it may concern:*

Be it known that I, EDWARD REISERT, of Cologne, Prussia, have invented a new and Improved Automatic Beam-Scale, of which the following is a specification.

In the accompanying drawings, Figure I represents a side view of my automatic scale embodying my invention. Fig. II is a front view of the same. Figs. III and IV represent different positions of the scales at different stages of the operation. Figs. V, VI, and VII represent side views of different positions of the mechanism of an automatic scale for more bulky articles. Fig. VIII represents side elevation of mechanism to operate the regulating-register and its connection with the scales on an enlarged scale.

The side and supporting frames of the scale are not shown in any of the figures, except in Fig. II, to be able to represent the parts more clearly.

Similar letters in Figs. I, II, III, IV, and VIII represent similar parts in the same, and similar letters in Figs. V, VI, and VII represent similar parts in those figures.

In Figs. I, II, III, and IV, A represents the scale-beams, supported in the usual manner and having on one end a vessel, B, suspended from arms $a$, and at their other end the weight C. This weight is either of a size to counterbalance the weight of the vessel B and its fixed contents—say, of ten, twenty, fifty, or one hundred kilograms or more—or the same may be made to counterbalance the vessel B and the mechanism thereto attached, and a separate weight of the fixed and desired contents to be weighed attached thereto.

T is a hopper into which the corn, wheat, or other similar articles to be weighed are brought to fill the vessel B. This hopper terminates in a funnel-shaped mouth-piece, K, the mouth of which is gradually closed by a valve, E, during the operation, and is quite closed as soon as the exact quantity or weight has run into said vessel B, as will be hereinafter more fully described.

When the weight C has been counterbalanced, and the vessel B, with its contents, has moved downward, the bottom of said vessel B opens automatically to discharge its contents.

Each discharge of the vessel is marked on a suitable index, J, so as to show at any moment the exact quantity weighed. This index or indicator J is of the usual construction, and is operated through the rod N', Fig. I, in connection with an elongation of the fork-piece $f$, or with any other regularly-moving part.

When the contents of the vessel B have been discharged, the bottom $b$ closes again by its own weight, and the vessel returns to its normal upward position to be again filled. At the same time the valve E at the bottom of the hopper T opens to allow again the admission of the material into said vessel B.

The bottom $b$ of the vessel B turns on its axis O and has weights $m$ and $n$ attached to counterbalance the same, so as to close the same after the contents of the vessel B have been discharged.

To the vessel B a pin, $p$, is attached, upon which a lever, V, is fitted, capable of turning. This lever has at one end a projection, $y$, and at its other end a heavy weight, H. As soon as the bottom $b$ is closed, the end $q$ of a segment, Q, attached to the bottom $b$, hooks into a corresponding cavity, $h$, in the lower part of the weight H, which firmly locks said bottom and prevents the opening of the same until this weight is moved clear of the end of the segment.

F is a shaft, consisting of two parts, $s$ and $t$, (see Fig. II,) capable of turning independent of each other. To the part $s$ an arm, D, supporting the valve E on one side, is firmly attached, as well as a small lever or arm, $e$, arranged to bear upon the end of the beam-arm A. To the part $t$ a corresponding arm, D', supporting the other side of the valve E, is fitted, capable of turning freely on said part $t$; and a fork-piece, $f$, a long lever, Z, and a small lever or arm, $g$, are firmly attached to said part $t$, the arm $g$ being arranged to bear upon the end of the beam-arm A.

When the vessel B is empty and ready to receive the material to be weighed, the position of the several parts will be as shown in Fig. I. The vessel B is held in its upward position in consequence of the counter-weight C. The small arm $e$ rests upon one of the beam-arms A, and holds, therefore, the valve E in such a position that the lower mouth of the hopper T is quite open to allow the material to run freely into the vessel B, and the small arm or lever $g$ rests upon the end of the other beam-arm, A, and holds thereby the lever Z upward, and the fork-piece $f$ is in a position to be clear of a projecting pin, $l$, attached to the arm D', Fig. I. In this position, the valve E being full open, the material can fall from the hopper T in a large stream into the vessel B to fill the same.

Some time before the vessel B is quite filled with the fixed quantity of the material, the same, as well as the beams A, will move downward as this side of the beam-arms are acted upon or loaded, besides the weight of the vessel B and of the material run into the same, by the weight of the valve E, which is supported, through its arm $e$, upon one of the beams A, and by the weight of the lever Z, which is supported, through its arm $g$, upon the end of the other beam A. This downward movement will continue until the beams A come in a position as represented in Fig. III. At this point of the motion of the scales the arm Z has moved so far downward that a projection, $z$, on said arm or lever Z will come against and is hooked into a projection, $x$, on the lever X, turning on a fixed center, $w$, attached to the side framing. By this operation the lever Z is held fast, and the weight of the same is taken off from the end of the beam-arm A. The valve E, resting, through its arm $e$, with its weight upon the other beam-arm, thereby participating with the motion of said beam-arm, has nearly closed the end of the hopper, and has moved so far that the pin $l$, fast on the arm D', has come against the upper surface of the fork-piece $f$, whereby the further motion of the valve E is stopped; and, as the fork-piece $f$ is firmly attached to the shaft $t$, as above mentioned, this coming in contact of the pin $l$ with the fork-piece $f$ supports the valve E, and relieves the end of the beam-arm of its weight. This taking off of the weights of the arm Z and of the valve E from the beam-arms brings the scales again at rest, as, as above mentioned, the vessel B has not yet been filled with the desired and fixed quantity.

The valve E has nearly closed the lower mouth of the hopper or funnel end K, leaving only small recesses $v$, made in the edge of said valve, open, thereby allowing the material to flow only in one or more small streams into the vessel B until the exact and fixed quantity or weight of the material has fallen into the vessel B.

Against the side of the mouth-piece K bristles Y, or some other suitable and flexible material, are attached, bearing, when the valve E is closing, upon the surface of said valve, forming a packing to prevent the escape of the material. This arrangement prevents the necessity of fitting the lower end of the mouth-piece K tight upon or against the surface of the valve E, and consequently prevents any unnecessary friction, at the same time preventing the possibility of any obstruction or stoppage which might occur by the lodgment of a kernel of wheat or other material between the sharp edges of the valve E and of the end of the mouth-piece K while closing.

As soon as the exact fixed quantity of material has run or fallen into the vessel B the scale-beams A will suddenly turn. By the upward movement of the weight C, a projection, $c$, attached to said weight or to its suspending-arm, will come in contact with the end of the lever X, moving the same so as to throw its projection $x$ away from the projection $z$ on the lever Z, in consequence of which said lever Z will fall downward. By this downward motion of the lever Z the fork-piece $f$ will be moved so that its lower prong comes against the pin $l$ on the valve-arm D', moving the valve E so as to close the mouth of the hopper completely. At the same time this lever Z will come in contact with the projection $y$ on the lever V, moving thereby said lever so as to bring the end cavity $h$ in the weight H clear of the projection or end $q$ of the segment Q, whereby the bottom $b$ looses its support, and the same, being loaded with the material in the vessel B, will turn on its axis O, and, opening the vessel, allow the material to fall out.

As soon as the material has been emptied and the bottom valve, $b$, is relieved of this weight, the counter-weights $m$ and $n$ will close this bottom valve, $b$, and the weight C will lift up the vessel into its normal position ready for the next operation.

When the bottom $b$ is open the weight H of the lever V will rest upon the segment Q until the bottom is quite closed, when the cavity $h$ comes against the projection or end $q$ of this segment Q, and locks the bottom securely, as above described.

In case the weight C should begin to lift the vessel B before this bottom valve, $b$, is closed and securely locked, then the weight H, resting upon the segment Q, will prevent the upward motion of the lever Z, which comes then in contact with the upper edge, $v'$, of said weight H, and the end of the beam-arm A having come in contact with the small arm $g$, any further upward movement of the scales will be prevented, and the different parts will be in the position represented in Fig. IV.

When the bottom valve, $b$, is quite closed, the end of the lever Z can pass the upper end, $v'$, of the weight H, and the weight C will bring the vessel B in its normal upper position, and at the same time, the beam-arm A coming in contact with the small arm $e$, the valve E will be moved so as to open again the mouth of the hopper T, and the above-described operation will be repeated.

It will be perceived that the vessel B cannot be moved upward until the bottom $b$ is closed and securely locked, and that the valve E will not be opened until the vessel B is moved upward and brought nearly into its normal position, in consequence of which none of the material can run or fall through the same without being weighed and measured; and, further, that the bottom $b$ cannot be closed if any obstruction will occur at the bottom, and until the whole contents of the vessel B are discharged.

As above mentioned, the operations of the scales are indicated on an index or indicator, J.

To regulate the scales so that only a certain and fixed number of operations shall be made, or, in other words, only a certain quantity of material to pass through the vessel B, and then the operation of the scales stopped, a second register or indicator, U, connected by levers with the scales, is arranged. This register U consists of a number of wheels or disks placed side by side, (see Fig. II,) with the numbers from 0 to 9 engraved on their circumference, and connected together in the usual manner.

On this register-frame a shaft, 12, is arranged, upon which the usual lever for operating the disks of this register is arranged. A lever, $d$, attached to this shaft 12, (see Fig. VIII,) connects with a rod, 8, on the upper end of which a slot or opening of a fixed length is made, in which a pin, 10, fast to the elongation of the fork-piece $f$, or to an arm attached to the lever Z, is arranged to work.

To the rod 8 a pin, 15, is attached. Above this pin 15 a lever, R, is arranged, turning on a fixed center, 3, attached to the framing of the scales. This lever R is held by a suitable catch (not shown in the drawings) in the required position, so that during the regular motion of the rod 8 the pin 15 will not come in contact with the same. This lever R has a nose or projecting part, $r$, at its forward end, capable of engaging with a projection, $u$, on the lever Z whenever said lever Z moves far enough back toward this nose $r$.

In the surface of each of the disks of this register U an oblong cavity or opening, $k$, is made (see Figs. II and VIII) at equal distance from the cipher 0 marked on their faces.

To the shaft 12 a number of levers, 5, corresponding with the number of disks in the register, are attached, having noses at their ends corresponding with and fitting into the cavities or openings $k$.

When this register U is in operation these noses of the levers 5 will come against the periphery of the disks, and, as said levers are attached to the shaft 12, the lever $d$ and rod 8 will thereby be held in a certain position, and a limited amount of motion only can be communicated to the rod 8—or, in other words, the motion of the pin 10 will be limited by coming in contact with the top end of the slot or opening in the upper end of the rod 8, as the action of one or more of the noses of the levers 5 against the periphery of the disks regulates this position, but at the same time allows the necessary motion to operate the disks in the usual manner.

During the regular action of this indicator U the several parts—such as lever Z, arm or elongation $f$, levers 5 and $d$, and rod 8—will move from their positions (indicated in the drawings by strong lines) to the positions indicated by broken lines. (See Fig. VIII.) This limitation of the motion of the pin 10 regulates at the same time the backward motion of the lever Z, and prevents the projection $u$ on said lever Z from coming in contact with the nose $r$ on the lever R.

The numbers from 0 to 9 engraved upon the circumference of the disks are so arranged that during the operation of the same this register will count backward.

The operation of this register in connection with the scale is as follows:

If, for example, it is desired to weigh and measure the contents of the vessel B thirteen hundred and sixty-five times, after which the scales shall be stopped, the disks of this indicator U are, before operation, moved in such a position as to indicate the number 1365.

When the scales have operated thirteen hundred and sixty-five times the ciphers 0 0 0 0 will appear on the disks in one line, and at which time the openings $k$ will all be in a line, when the noses of the levers 5 attached to the shaft 12 will fall into these openings $k$, whereby the rod 8 can be moved farther upward, as shown by dotted lines, Fig. VIII, thereby bringing the pin 15 against the lever R to unhook the same, at the same time allowing the pin 10 to move farther upward, and consequently allowing the lever Z to fall lower or move farther backward in a position indicated by dotted lines, Fig. VIII, whereby its projection $u$ will come into the projection or nose $r$ at the end of the lever R, and thus securely lock and hold fast the lever Z, and consequently stop any further operation of the scales until said lever Z is moved clear again from the nose $r$ of the lever R.

The above-described mechanism and scales are for weighing fine materials, such as wheat, corn, and similar articles, and the arrangement of the mechanism for more bulky articles, such as potatoes, coal, turnips, beet-roots, &c., is represented in Figs. V, VI, and VII.

For this arrangement the end of the hopper K is made sufficiently large to prevent any stoppage in the mouth. To the end of the mouth K an inclined plate, L, is attached, at the end of which the valve E is arranged. This valve E is provided with a counter-weight, M, having a tendency to keep said valve always closed, and with a lever, N, capable of resting upon the lever Z and to be operated by the same. In the position shown in Fig. V the lever Z presses this lever N upward, lifting thereby the weight M, and keeps the valve E open to allow a free and full discharge or flow of the articles into the vessel B. Shortly before the fixed full weight has run into the vessel B, said vessel and the lever Z move downward in consequence and in the manner substantially as has been above described, thereby allowing likewise the lever N, resting upon the lever Z, to move partly downward, whereby the valve E will be partly closed and only a small quantity of the articles will be allowed to pass into the vessel B. The position of the several parts will at that point of the operation be as represented in Fig. VI.

When the exact fixed quantity of the article has fallen or been filled into the vessel B the sudden changing of the position of the scale-beams A and consequent receding of the weight C causes the projection $c$ on said weight to come in contact with the lever X and relieve the same from the lever Z, causing said lever Z to fall, substantially in the manner above described. By the falling of this lever Z the lever N will be relieved from the action of this lever Z, and the weight M will close the valve E, when the position of the several parts will be as shown in Fig. VII.

What I claim as my invention, and desire to secure by Letters Patent, is—

1. In combination with the mouth-piece or end of a hopper, T, the valve E, supported on a shaft, F, made in two parts, $s$ and $t$, the shaft $s$ having one of the supporting-arms D of said valve firmly attached, as well as a lever, $e$, bearing upon the end of the scale-beam A, while the other supporting-arm, D′, of said valve is attached loosely upon the part $t$ of the shaft F, and is provided with a pin, $l$, in combination with a fork-piece, $f$, and lever Z, firmly attached to said shaft $t$, the whole being arranged to operate in the manner and for the purpose substantially as described.

2. In combination with the end K of a hopper, T, the valve E, provided with recesses or cavities $v$ on its end edge, and the bristles Y, or their equivalent, attached to said mouth-piece K, in the manner and for the purpose described.

3. The combination of the lever Z, with projection $z$, the lever X, with projection or nose $x$, and projection $c$, attached to the weight C, or its equivalent, at the end of the beam-arms A, substantially as and for the purpose described.

4. In a vessel, B, suspended on beam-arms A, and provided with a hinged bottom, $b$, counterbalanced by weights $m$ and $n$, the segment Q, attached to said bottom $b$, in combination with a lever, V, turning on a center, $p$, attached to the vessel B, and provided with a suitable weight, H, having a recess or cavity, $h$, arranged to operate in the manner and for the purpose substantially as set forth.

5. The combination of the vessel B, suspended from the scale beams A, and provided with a swinging bottom, $b$, the lever V, turning on a fulcrum, $p$, attached to said vessel B, and provided with a projection, $y$, on one end and a weight, H, at its other arm, the segment Q, attached to the hinged bottom $b$, the swinging lever Z, the arm $g$, the whole being arranged to operate in combination with the scale-beams A, substantially in the manner and for the purpose described.

6. The combination of the suspended vessel B, with hinged bottom $b$, and provided with a segment, Q, the lever V, the swinging lever Z, the arm $g$, and fork-piece $f$, the valve E, suspended by arms D and D′, said arm D′ being provided with a projecting pin, $l$, the arm $e$, and the scale-beams A, the whole being arranged to operate substantially in the manner and for the purpose specified.

7. The swinging lever Z, arm $g$, and scale-beams A, in combination with the lever R, having a projection or nose, $r$, at its end fitting into a corresponding projection, $u$, on the lever Z, arranged to operate in combination with an indicator, U, substantially in the manner and for the purpose described.

8. In combination with an automatic scale, a register or indicator, U, arranged to count backward, and having a recess or cavity, $k$, in each one of its revolving disks at equal distance from the cipher 0, marked on each of said disks, in combination with levers 5, having projecting noses fitting into said recesses or cavities, and attached to the shaft 12, which operates the disks, as and for the purpose described.

9. The combination of an indicator, U, constructed as described, and connected, through lever $d$, rod 8, and pin 10, with the fork-piece $f$, or its equivalent, and provided with a pin or projection, 15, on the rod 8, with a lever, R, swinging lever Z, arm $g$, and the scale-beam A, the whole being arranged to operate substantially in the manner and for the purpose herein described.

10. The combination, with the mouth of a hopper, of the valve E, counter-weight M, and lever N, with the swinging lever Z, in the manner and for the purpose substantially as set forth.

EDWARD REISERT.

Witnesses:
HERMANN HEYER,
GEORG HEIDERILL.